US010416028B2

(12) United States Patent
Doppelhammer et al.

(10) Patent No.: US 10,416,028 B2
(45) Date of Patent: Sep. 17, 2019

(54) TEMPERATURE OF A LINK CAPACITOR (71) Applicant: B&R INDUSTRIAL AUTOMATION GMBH, Eggelsberg (AT)

(72) Inventors: Klaus Doppelhammer, St. Martin (AT); Johann Eder, Michaelbeuern (AT); Gerhard Mayrhofer-Huber, St. Georgen im Attergau (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 258 days.

(21) Appl. No.: 15/418,048

(22) Filed: Jan. 27, 2017

(65) Prior Publication Data

US 2017/0219441 A1      Aug. 3, 2017

(30) Foreign Application Priority Data

Jan. 29, 2016   (AT) .............................. A 50048/2016

(51) Int. Cl.
| | |
|---|---|
| *G06F 17/50* | (2006.01) |
| *G01K 7/34* | (2006.01) |
| *G01K 3/12* | (2006.01) |
| *H02M 5/458* | (2006.01) |
| *G01K 7/16* | (2006.01) |

(52) U.S. Cl.
CPC ................. *G01K 7/34* (2013.01); *G01K 3/12* (2013.01); *G01K 7/16* (2013.01); *H02M 5/458* (2013.01); *G01K 2217/00* (2013.01)

(58) Field of Classification Search
USPC ....................................................... 703/13, 14
See application file for complete search history.

(56) References Cited

U.S. PATENT DOCUMENTS

| | | | | |
|---|---|---|---|---|
| 2004/0264216 A1* | 12/2004 | Mednik | ............. | H02M 3/33523 363/18 |
| 2013/0155729 A1* | 6/2013 | Lee | ......................... | H02P 23/12 363/37 |

FOREIGN PATENT DOCUMENTS

| | | |
|---|---|---|
| DE | 10 2004 035 723 | 2/2006 |
| DE | 20 2014 101 916 | 5/2014 |

(Continued)

OTHER PUBLICATIONS

Europe Search Report conducted in counterpart Europe Appln. No. 17152999.3-1555 (Jun. 7, 2017).

(Continued)

*Primary Examiner* — Andre Pierre Louis
(74) *Attorney, Agent, or Firm* — Greenblum & Bernstein, P.L.C.

(57) ABSTRACT

To determine the temperature of a link capacitor (C) of a link converter (1) more accurately with less expenditure, a device and a method are described, in which the link capacitor (C) is modeled as a series interconnection of an equivalent capacitance (CS) and an equivalent series resistance (ESR), wherein a modeled capacitor current ($i_{Cm}$) flows across the equivalent series resistance (ESR). A modeled capacitor power loss ($P_C$), from which the capacitor temperature ($T_C$) is determined by means of a specified temperature model, is calculated from the modeled capacitor current ($i_{Cm}$) and the value of the equivalent series resistance (ESR) by means of a first relationship of the form $P_C=f(i_{Cm}, ESR)$. Direct measurement of the capacitor temperature ($T_C$), of the capacitor current ($i_C$), or of the capacitor power loss ($P_C$) is not required. For example, a measurement of the capacitor voltage ($u_C$) and a further calculation of the modeled capacitor current $i_{Cm}$ and finally of the capacitor power loss ($P_C$) are sufficient. The method can be used for the monitoring and processing of the capacitor temperature ($T_C$), particu- (Continued)

larly the switching-off of an element, preferably at least part of the link converter (1), when a maximum temperature, such as a preset maximum temperature, is exceeded. The method can also be used to determine the temporal progression of the capacitor temperature ($T_C(t)$) and also to determine the remaining service life (RL) of the link capacitor (C) of a specified relationship, preferably by means of the Arrhenius formula.

18 Claims, 4 Drawing Sheets

(56) References Cited

FOREIGN PATENT DOCUMENTS

| DE | 10 2013 203 299 | 8/2014 |
|----|-----------------|--------|
| EP | 2 637 030 | 9/2013 |
| JP | 20016-229130 | 8/2006 |
| KR | 2013 0110553 | 10/2013 |

OTHER PUBLICATIONS

Maddula et al., "Lifetime of Electrolytic Capacitors in Regenerative Induction Motor Drives," Power Electronics Specialists Conference, 2005, PESC '05, IEEE 36$^{th}$, IEEE, Piscataway, NJ, pp. 153-155 (Jan. 1, 2005).

Aeloiza et al., "A Real Time Method to Estimate Electrolytic Capacitor Condition in PWM Adjustable Speed Drives and Uninterruptible Power Supplies," Power Electronics Specialists Conference, 2005, PESC '05, IEEE 36$^{th}$, IEEE, Piscataway, NJ, pp. 2867-2869 (Jan. 1, 2015).

Austria Search Report conducted in counterpart Austria Appln. No. A 50048/2016 (dated Dec. 5, 2016).

\* cited by examiner

TEMPERATURE OF A LINK CAPACITOR

CROSS-REFERENCE TO RELATED APPLICATIONS

The present application claims priority under 35 U.S.C. § 119(a) of Austria Patent Application No. A50048/2016 filed Jan. 29, 2016, the disclosure of which is expressly incorporated by reference herein in its entirety.

BACKGROUND OF THE INVENTION

1. Field of the Invention

The present invention relates to a method and a device for determining a temperature progression of a link capacitor of a link converter that contains at least one n-phase inverter. Furthermore, the use of the methods according to the invention to determine the remaining service life of the link capacitor from the temperature progression is described.

2. Discussion of Background Information

Link converters are used in a large number of circuits, including servo amplifiers, frequency converters, converters, feeders/feedback devices, etc., particularly for electric motor drives, for example stepper motors or brushless direct-current motors, etc. Capacitors, particularly electrolytic capacitors (e-caps), are often installed in links as energy-storing elements, wherein these link capacitors are used to smooth the link voltage. In some systems, only a limited number of such capacitors can be installed because of desired space saving. The service life of the whole circuit or of circuit parts is often dependent primarily on the service life of the capacitor of the link. Because thermal problems can occur in the link capacitors in the case of high power requirements, it is advantageous if the remaining service life of the link capacitor is known. In turn, the capacitor service life can be determined from a temporal temperature progression of the capacitor in a known manner by means of the Arrhenius formula. The ambient temperature and/or the ripple current load of the capacitor is often used for this purpose. Therefore, it is usually possible to determine the capacitor service life only in the laboratory, because only there can defined conditions (ambient temperature, current progression, etc.) be created. This approach is often used for the a priori design and optimization of capacitors. In the case of known requirements, capacitors having desired properties can then be used.

However, especially in the case of requirements not known beforehand, it is often desirable that the (remaining) service life of a capacitor can be predicted or determined also during ongoing operation, and in particular while the capacitor is installed in a link converter. KR 2013 0110553 A provides such an approach, wherein in the document the converter supplies an electric motor. The total electrical power of the converter circuit is calculated on the basis of the torque of the electric motor and the angular velocity of the associated rotor. Subsequently, the ripple current is estimated on the basis of the voltage present at the link capacitor and the determined total power. Then the progression of the temperature of the link capacitor is determined from the progression of the estimated ripple current on the basis of stored characteristic curves, and subsequently the service life of the link capacitor is determined. A disadvantage in this case is that the determined total power of the converter does not correspond to the power consumed at the link capacitor and therefore subsequently the estimated ripple current does not actually correspond to the current through the link capacitor. Therefore, the determined temperature progression also is highly inaccurate. Furthermore, additional sensors are required to determine the torque and the velocity.

The capacitor current and the capacitor voltage or the power consumed at the link capacitor or the capacitor temperature could be determined by measurement. However, the entire additional measurement equipment required for this purpose is often undesired in a link converter for reasons of cost of space. In particular, the measurement of the capacitor temperature (i.e., the temperature inside the link capacitor) would require special link capacitors that are equipped with integrated temperature sensors and are therefore expensive.

SUMMARY OF THE EMBODIMENTS

Therefore, embodiments of the invention determine the temperature of a link capacitor in a link converter circuit more accurately with less expenditure, wherein in particular the aforementioned disadvantages should also be avoided.

In embodiments, the link capacitor is modeled as a series interconnection of an equivalent capacitance and an equivalent series resistance and a modeled capacitor current flows across the equivalent series resistance. A modeled capacitor power loss is calculated from the modeled capacitor current and the value of the equivalent series resistance by means of a first relationship of the form $P_C=f(i_{Cm}, ESR)$, from which modeled capacitor power loss the capacitor temperature is determined by means of a specified temperature model.

In the model with the equivalent capacitance and the series resistance, the modeled capacitor power loss occurs at the series resistance. Therefore, the capacitor current flowing through the series resistance and thus through the link capacitor is itself modeled and, on the basis thereof, the modeled capacitor power loss at the link capacitor is calculated. On the basis thereof, the capacitor temperature can be determined by means of a known temperature model, for example a PT1 model.

A calculating unit can be provided for the calculation of the capacitor temperature in accordance with the invention.

Advantageously, $P_C = i_{Cm}^2 ESR$ is used as the first relationship.

The modeled capacitor current can be modeled by using a measured capacitor voltage and the equivalent capacitance CS, wherein a second relationship of the form $i_{Cm}=f(u_C, CS)$ is used.

Advantageously, $$i_{Cm} = CS\frac{d}{dt}u_C$$

is used as the second relationship.

For this purpose, a voltage-measuring unit and a differentiating unit can be present, wherein the voltage-measuring unit determines a capacitor voltage present at the link capacitor and feeds said capacitor voltage to the differentiating unit, and the differentiating unit determines the modeled capacitor current after multiplication by the equivalent capacitance.

Advantageously, the modeled capacitor current is split into a low-frequency component and a high-frequency component, wherein the low-frequency component of the modeled capacitor current is used to determine a first modeled power loss and the high-frequency component of the modeled capacitor current is used to determine a second modeled power loss. The modeled capacitor power loss is calculated from the sum of the first and the second modeled power losses.

The split into a high-frequency component and a low-frequency component of the modeled capacitor current can depend on the switching frequency of the inverter of the link converter. If a PWM control system is used, the PWM switching frequency can therefore be used to determine the limit between the high-frequency component and the low-frequency component of the modeled capacitor current.

Advantageously, the low-frequency component of the modeled capacitor current is determined by mean-filtering the capacitor voltage and/or a time derivative of the capacitor voltage and/or the modeled capacitor current. High-frequency components are thereby cut off and subsequently have no influence on the first modeled power loss. If the capacitor voltage is mean-filtered, only low-frequency components of the capacitor voltage are processed further. In accordance with the second relationship, for example by taking the time derivative and multiplying it by the first capacitance, the low-frequency component of the modeled capacitor current is inferred. If the second relationship is used first, however, the modeled capacitor current having high-frequency and low-frequency components is first calculated and thereafter mean-filtered to cut off the high-frequency component and to obtain the low-frequency component. However, a very high sampling frequency is necessary for this purpose.

The low-frequency modeled capacitor current can be calculated in a low-frequency unit, wherein low-pass filters are provided before and after the differentiating unit to perform the mean-filtering. Furthermore, the low-pass filter is used to avoid aliasing problems and to smooth the signal.

The high-frequency component of the modeled capacitor current can be calculated from an inverter current caused by the inverter, and this is advantageously performed in a high-frequency unit. Here, the link-side inverter current should be regarded as the inverter current. The inverter current can be directly measured or calculated from the phase-side phase currents of the converter, or of the inverter, wherein the measurement of two phase currents would be sufficient, because the third phase current can be calculated from the two first phase currents. If several inverters are present, the high-frequency component of the modeled capacitor current can be determined from the sum of the (link-side) inverter currents.

Subsequently, the square of the high-frequency component of the modeled capacitor current can be calculated by determining the square of the arithmetic mean of the inverter current and the arithmetic mean of the squared inverter current and subtracting the square of the arithmetic mean of the inverter current from the arithmetic mean of the squared inverter current. A number of mean calculators can be present for this purpose.

The arithmetic mean of the inverter current can be calculated in a time-discrete manner by sampling the inverter current at a first sampling rate in a first time span, wherein a first number of sample values of the inverter current is produced and the sum of the sample values of the inverter current is divided by the first number.

Similarly, the arithmetic mean of the squared inverter current can be calculated by sampling the squared inverter current at a second sampling rate in a second time span, wherein a second number of sample values of the squared inverter current is produced and the sum of the sample values of the squared inverter current is divided by the second number.

The determined capacitor temperature can be recorded over time, for example in a memory unit provided for this purpose.

The device can be used for the monitoring and processing of the capacitor temperature, particularly the switching-off of an element, preferably at least part of the link converter, when a maximum temperature, such as a preset maximum temperature, is exceeded. This can serve to avoid overheating of the capacitor or to minimize the duration of the elevated temperature.

Furthermore, a problem addressed by the present invention is that of determining the remaining service life of a capacitor of a link of a link converter. This is solved by using the method according to the invention also to determine the temporal progression of the capacitor temperature and furthermore to determine the remaining service life of the link capacitor from the temporal progression of the capacitor temperature by means of a specified relationship, preferably by means of the Arrhenius formula.

If the Arrhenius formula is used, the temporal progression of the capacitor temperature is used, and the ambient temperature of the link capacitor can also be incorporated, for which purpose a temperature sensor can be used. Advantageously in comparison with the prior art, the capacitor current and subsequently the capacitor power loss are therefore directly modeled instead of merely the total current of the link converter being calculated from the total power consumption and being used to determine the temperature.

Other exemplary embodiments and advantages of the present invention may be ascertained by reviewing the present disclosure and the accompanying drawing.

BRIEF DESCRIPTION OF THE DRAWINGS

The present invention is illustrated in more detail below with reference to FIGS. 1 to 6, which schematically show advantageous embodiments of the invention, which serve as examples and are not restrictive.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
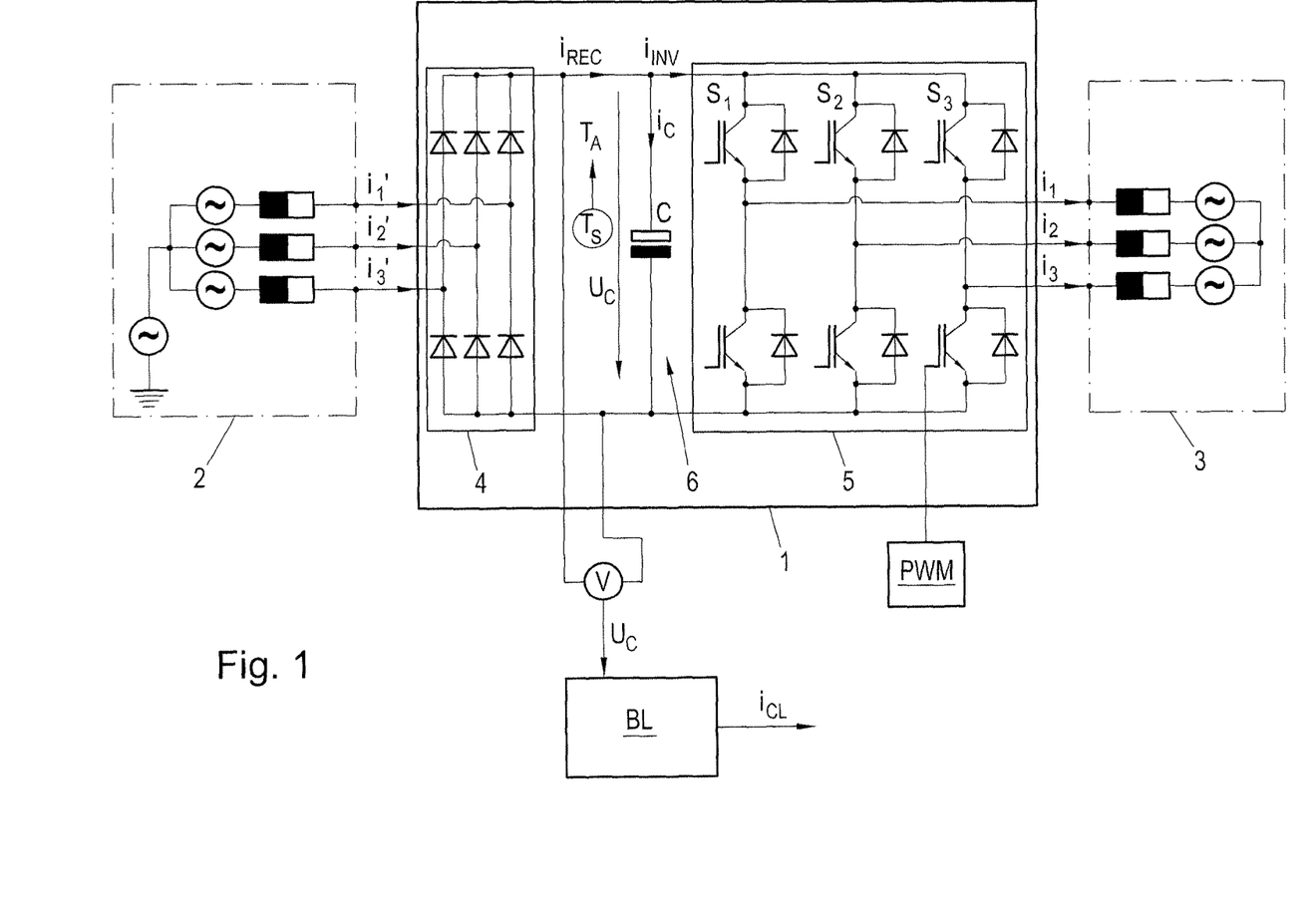
FIG. 1 shows a simplified circuit diagram of a link converter in the form of a servo amplifier.

As an example of the use of a link converter 1, a simplified circuit diagram of a servo amplifier is shown in FIG. 1. The link converter 1 is connected to the supply network 2 on the input side and to an electric motor 3 on the output side, wherein the supply network 2 supplies the phase currents $i_1'$, $i_2'$, $i_3'$ to the link converter 1 and the link converter 1 supplies the inverter currents $i_1$, $i_2$, $i_3$ to the electric motor 3. The link converter 1 could also be supplied by a different voltage source, for example by using link terminals. A rectifier 4 is installed on the side of the supply network 1 and converts the input-side m-phase alternating voltage into a direct voltage, which feeds a direct-voltage link 6 (DC link). If the link converter is supplied by means of a different voltage source, a rectifier 4 can also be unnecessary under certain circumstances. On the output side, on the side of the electric motor 3, an n-phase inverter 5 is provided, which is controlled, e.g., by a PWM control system (for purposes of clarity, only shown for one power switch of the inverter 5). The present invention concerns inverters 5 having an arbitrary number n of phases. An inverter having n=3 phases is presented as an example. In FIG. 1, the supply network 2 is also designed with three phases with m=3, as are the rectifier 4 and the electric motor 3, but this should be understood as only an example, because the numbers of the phases of the supply network, of the rectifier 4, and of the electric motor 3 do not have to match. In the present example, the rectifier 4 is designed as a half-bridge for each of the m phases in a known manner and consists of two diodes per phase. Of course, the rectifier 4 could also be present in a different design, for example as an active front end (AFE) of a feeder/feedback device. The inverter 5 is realized, in a likewise known manner, by means of power switches S, for example IGBTs or MOSFETs. A link capacitor C, for example an electrolytic capacitor (e-cap), is installed as an energy-storing element of the DC link 6. Of course, with respect to circuitry, the link capacitor C can also be designed as a combination interconnection (series interconnection, parallel interconnection) of several individual link capacitors. The rectifier 4 provides the rectifier current $i_{REC}$, and the inverter 5 draws the current $i_{INV}$ in accordance with the electrical load. The capacitor current $i_C$ flows across the link capacitor C.

Figure 2:
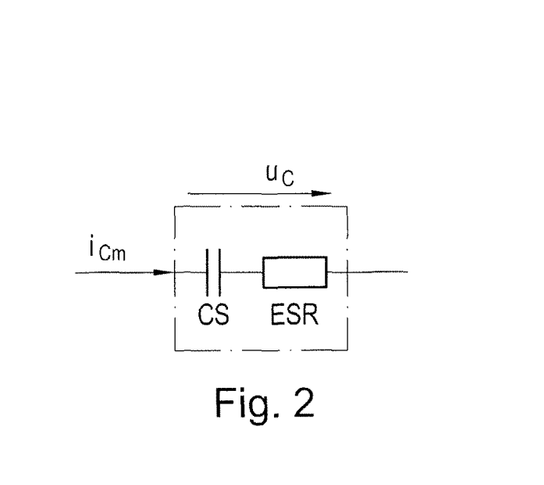
FIG. 2 shows an equivalent circuit diagram of a link capacitor.

FIG. 2 shows the equivalent circuit diagram of the link capacitor C that is used in the invention. The link capacitor C is modeled by means of an equivalent capacitance CS and an equivalent resistance ESR, which is assumed to be in series and which is generally frequency-dependent. The modeled capacitor current $i_{Cm}$ flows across the equivalent resistance ESR, which is usually a few milliohms and which can be assumed to be known.

Figure 3:
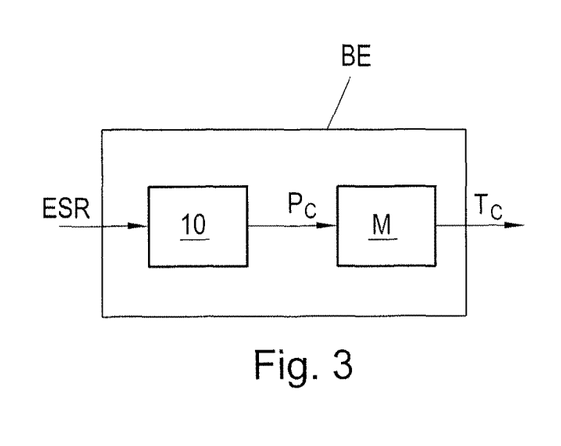
FIG. 3 shows a calculating unit having a model component.

In a calculating unit BE, a modeled capacitor power loss $P_C$ is calculated in a power-calculating unit 10 from the modeled capacitor current $i_{Cm}$ and the value of the equivalent series resistance ESR by means of a first, specified relationship of the form $P_C=f(i_C, ESR)$, for example $P_C=i_C^2$ ESR. Furthermore, according to the invention, the present capacitor temperature $T_C$ is determined from the modeled capacitor power loss $P_C$ by means of a known temperature model 11 implemented in a model component M, as shown in FIG. 3. Therefore, the goal is to approximate the capacitor current $i_C$ by means of the modeled capacitor current $i_{Cm}$, in the first step so that the modeled capacitor power loss $P_C$ and then also the capacitor temperature $T_C$ dependent thereon can be calculated.

Figure 3A:
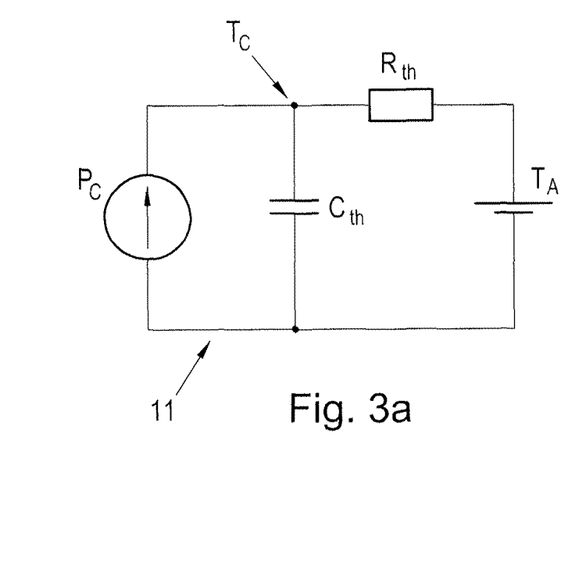
FIG. 3*a* shows a thermal model of the link capacitor.

FIG. 3a shows a possible temperature model 11 of the link capacitor C, which temperature model makes it possible to calculate the capacitor temperature $T_C$ of the link capacitor C from the modeled capacitor power loss $P_C$. Here, the temperature model 11 is presented as a model having a 1st-order lag element, a PT1 element, wherein of course other temperature models also can be used. In the temperature model 11, the modeled capacitor power loss $P_C$ is a thermal current source in the thermal network. Because of a thermal capacitance $C_{th}$ and a thermal resistance $R_{th}$, a thermal voltage arises at the thermal capacitance $C_{th}$, corresponding to the capacitor temperature $T_C$. For this purpose, as shown in FIG. 1, the ambient temperature $T_A$ of the link capacitor, which ambient temperature is presented as a thermal voltage source in the temperature model 11, is measured by means of the temperature sensor TS. Alternatively, the ambient temperature $T_A$ could also be estimated by means of a suitable method, for example from a specified (maximum) ambient temperature. The ambient temperature $T_A$ and the modeled capacitor power loss $P_C$ are fed to the temperature model 11 and the capacitor temperature $T_C$ is calculated therefrom.

The modeled capacitor current $i_{Cm}$ can be modeled, for example, by using the measured capacitor voltage $u_C$ and the equivalent capacitance CS, wherein a second relationship of the form $i_C=f(u_C, CS)$, for example $$i_{Cm} = CS\frac{d}{dt}u_C,$$

can be used.

The time derivative can, for example, be in the form of a discrete derivative over a discrete time span $\Delta T$ with a time index k:

$$i_{Cm} = CS\frac{d}{dt}u_C = CS\frac{u_{C,k} - u_{C,k-1}}{\Delta T}$$

The discrete time span $\Delta T$ thus corresponds to the inverse sampling rate and generally lies far above the inverse of the PWM switching frequency. Expressed in frequencies, the sampling frequency lies far below the PWM switching frequency, and therefore high-frequency components of the modeled capacitor current $i_{Cm}$ would be cut off undesirably. Therefore, to calculate the modeled capacitor current $i_{Cm}$ directly by means of this approach, a sampling frequency as a multiple of the PWM switching frequency would be necessary in the case of the discrete implementation of the derivative, thus resulting in a sampling frequency in the MHz range. Although this would be technically possible, it would in general often be uneconomical because of the necessary components and additionally might cause further problems, such as problems regarding electromagnetic compatibility (EMC).

Therefore, an advantageous embodiment of the determination of the modeled capacitor current $i_{Cm}$ is described below on the basis of FIGS. 5 and 6.

The modeled capacitor current $i_{Cm}$ is advantageously split into a low-frequency component $i_{CL}$ and a high-frequency component $i_{CP}$ (also called pulse-frequency component), wherein the low-frequency component $i_{CL}$ of the capacitor current $i_{Cm}$ is used to determine a first power loss $P_{CL}$ and the high-frequency component $i_{CP}$ of the capacitor current is used to determine a second power loss $P_{CP}$. The capacitor power loss $P_C$ is calculated from the sum of the first power loss $P_{CL}$ and the second power loss $P_{CP}$.

$$P_C = P_{CL} + P_{CP} = i_C^2 \text{ESR} = i_{CL}^2 \text{ESR}_L + i_{CP}^2 \text{ESR}_P$$

Strictly speaking, the squares of the high-frequency component $i_{CP}^2$ and of the low-frequency component $i_{CL}^2$ of the capacitor current are processed. The splitting of the square of the capacitor current $i_C^2$ into the sum of the squares of the low-frequency component $i_{CL}^2$ and of the high-frequency component $i_{CP}^2$ is possible for all signals (including aperiodic signals) that are split into a direct component (zero-mean) and into an alternating component in the interval in which the mean calculation has occurred. In the case of sinusoidal oscillations, the product $i_{CL} \cdot i_{CP}$ is integrated, for example over one period, and is equal to zero because of the orthogonality of the sinusoidal oscillations. Quantitatively, the first power loss $P_{CL}$ and the second power loss $P_{CP}$ are approximately equal, and the equivalent series resistance ESR is split into the equivalent series resistances $\text{ESR}_L$ and $\text{ESR}_P$, which in turn are known in advance and can be obtained, for example, from the data sheet of the link capacitor.

A low-frequency unit BL preferably arranged in the calculating unit BE performs the calculation of the low-frequency component of the capacitor current $i_{CL}$ by mean-filtering the capacitor voltage $u_C$ and/or the time derivative of the capacitor voltage $$\frac{d}{dt} u_C$$

and/or the modeled capacitor current $i_{Cm}$. For this purpose, a low-pass filter TP can be arranged before a differentiating unit D, as shown in FIG. 5, in order to mean-filter the capacitor voltage $u_C$. Of course, it would also be (additionally) possible to install a (further) low-pass filter TP after the differentiating unit D in order to mean-filter the time derivative of the capacitor voltage $$\frac{d}{dt} u_C.$$

Mean-filtering of the determined modeled capacitor current $i_C$ would also be possible. What is important is that the high-frequency components are cut off. As indicated in FIG. 1, the capacitor voltage $u_C$ is measured by means of a voltmeter V and fed to the low-frequency unit BL. The measurement of the link voltage, corresponding to the capacitor voltage $u_C$, is usually implemented in a link converter 1 and therefore is not an additional expenditure. The low-frequency component of the modeled capacitor current $i_{CL}$ is then squared and multiplied by the low-frequency equivalent resistance $\text{ESR}_L$ to calculate the first power loss $P_{CL}$.

The cause of the low-frequency component of the modeled capacitor current $i_{CL}$ should be sought primarily on the side of the rectifier 4, wherein low-frequency processes such as load changes on the side of the inverter 5 also exhibit influences. The high-frequency component of the modeled capacitor current $i_{CP}$ is generally caused by the high-frequency switching in the inverter 5. If a PWM control system is used, the high-frequency frequency component is the PWM switching frequency and above, thus usually 5 kHz and above. Accordingly, frequencies below the PWM switching frequency should be regarded as the low-frequency component. Because the capacitor voltage $u_C$ at the link capacitor C is measured, low-frequency components from the electric motor 3 are also taken into account, in essence, and not only low-frequency components from the rectifier 4.

If a link converter 1 is fed by the supply network 2 (for example, a 50-Hz three-phase network, as shown in FIG. 1), a ripple having a frequency of 300 Hz (network ripple, 6 half-waves per period) arises after rectification. Superposed on said ripple are the reactions of the electric motor 3 resulting from the process currently being performed (process ripple). In practice, this frequency lies below 1000 Hz. Therefore, the first power loss $P_{CL}$ consists of the network ripple and the process ripple. Said network ripple could be reduced by means of an additional choke installed in the rectifier, resulting, however, in additional costs and increased space requirement. If the link converter 1 is supplied by means of a direct voltage by a link terminal instead of by the supply network 2, there is no network ripple and only the component of the process ripple remains for the first power loss $P_{CL}$. If, furthermore, the electric motor 3 is operated in the S1 mode (i.e., the load does not change), a first power loss $P_{CL}$ of zero arises.

Figure 6:
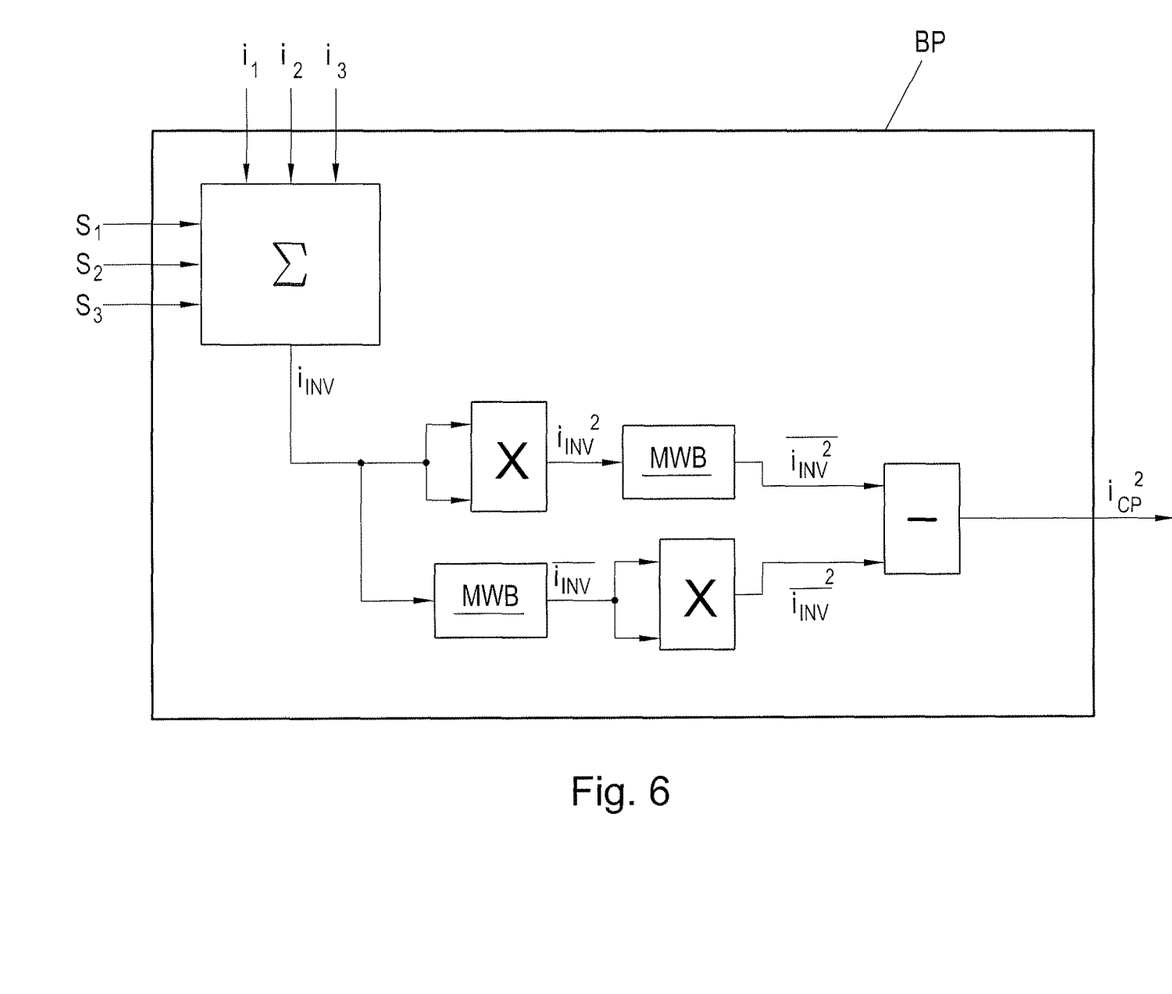
FIG. 6 shows part of the calculating unit for calculating the high-frequency component of the modeled capacitor current.

The high-frequency component of the modeled capacitor current $i_{CL}$ is calculated in a high-frequency unit BP, as described on the basis of FIG. 6, from the inverter current $i_{INV}$ caused by the inverter 5. For this purpose, the (link-side) inverter current $i_{INV}$ caused by the inverter 5 is advantageously first calculated as the sum of the phase currents $i_1$, $i_2$, $i_3$ of the inverter.

For a general pulse pattern of the upper switches $S_1$, $S_2$, $S_3$ of a 3-phase inverter 5, the phase currents $i_1$, $i_2$, $i_3$ of the inverter 5 according to the following table result:

| $S_1$ | $S_2$ | $S_3$ | $I_{INV}$ |
|---|---|---|---|
| 0 | 0 | 0 | 0 |
| 0 | 0 | 1 | $i_3$ |
| 0 | 1 | 0 | $i_2$ |
| 0 | 1 | 1 | $-i_1$ |
| 1 | 0 | 0 | $i_1$ |
| 1 | 0 | 1 | $-i_2$ |
| 1 | 1 | 0 | $-i_3$ |
| 1 | 1 | 1 | 0 |

Figure 4:
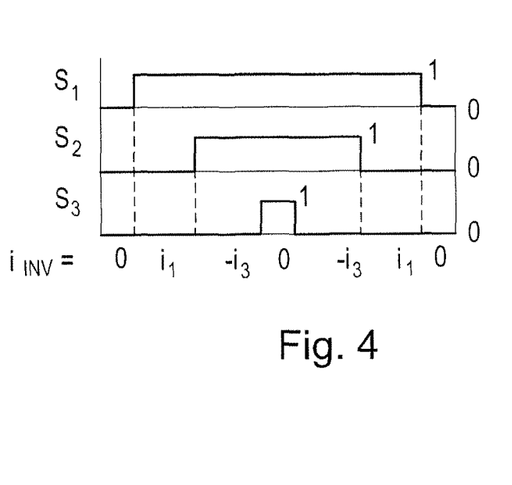
FIG. 4 shows a general pulse pattern of an inverter with associated phase currents.

For easier illustration, the general pulse pattern is also shown in FIG. 4. Especially advantageously, the inverter current $i_{INV}$ caused by the inverter 5 results from the measured first and second phase currents $i_1$ and $i_2$, wherein the third phase current $i_3$ is determined by means of Kirchhoff's first law with $i_3 = -i_1 - i_2$, with the aid of the pulse pattern presented in the table above and in FIG. 4:

$$i_{INV} = S_1 i_1 + S_2 i_2 + S_3 (-i_1 - i_2)$$

Of course, all phase currents $i_1$, $i_2$, $i_3$ or the inverter current $i_{INV}$ could also be measured directly. The phase currents $i_1$, $i_2$, $i_3$ are usually measured in a link converter 1 and therefore are available. The high-frequency component of the modeled capacitor current $i_{CP}$ (or the square of the high-frequency component $i_{CP}^2$) can be calculated from the inverter current $i_{INV}$ by means of the following method:

The square of the high-frequency component of the modeled capacitor current $i_{CP}^2$ is calculated by determining the arithmetic mean $\overline{i_{INV}}$ of the inverter current $i_{INV}$ (corresponding to the direct component) and the arithmetic mean of the squared inverter current $\overline{i_{INV}^2}$ and subtracting the square of the arithmetic mean $\overline{i_{INV}}^2$ from the mean of the squared inverter current $\overline{i_{INV}^2}$.

The calculation of the mean of the inverter current advantageously occurs in a time-discrete manner. With a first sampling rate $T_{S1}$, a first number $N_1$ of sample values of the inverter current $i_{INV}$ arises in a first time span $T_1$. Furthermore, the $N_1$ sample values of the inverter current $i_{INV}$ are summed and divided by the first number $N_1$.

Similarly, with a second sampling rate $T_{S2}$ in a second time span $T_2$, a second number $N_2$ of sample values of the squared inverter current $i_{INV}^2$ can be produced in a time-discrete manner. Furthermore, the $N_1$ sample values of the squared inverter current $i_{INV}^2$ are summed and divided by the second number $N_2$.

The arithmetic mean of the inverter current $\overline{i_{INV}}$ is calculated in a time-discrete manner by sampling the inverter current $i_{INV}$ at a first sampling rate TS1 in a first time span T1, wherein a first number N1 of sample values of the inverter current $i_{INV}$ is produced and the sum of the first number N1 of sample values of the inverter current $i_{INV}$ and are divided by the first number N1.

Figure 5:
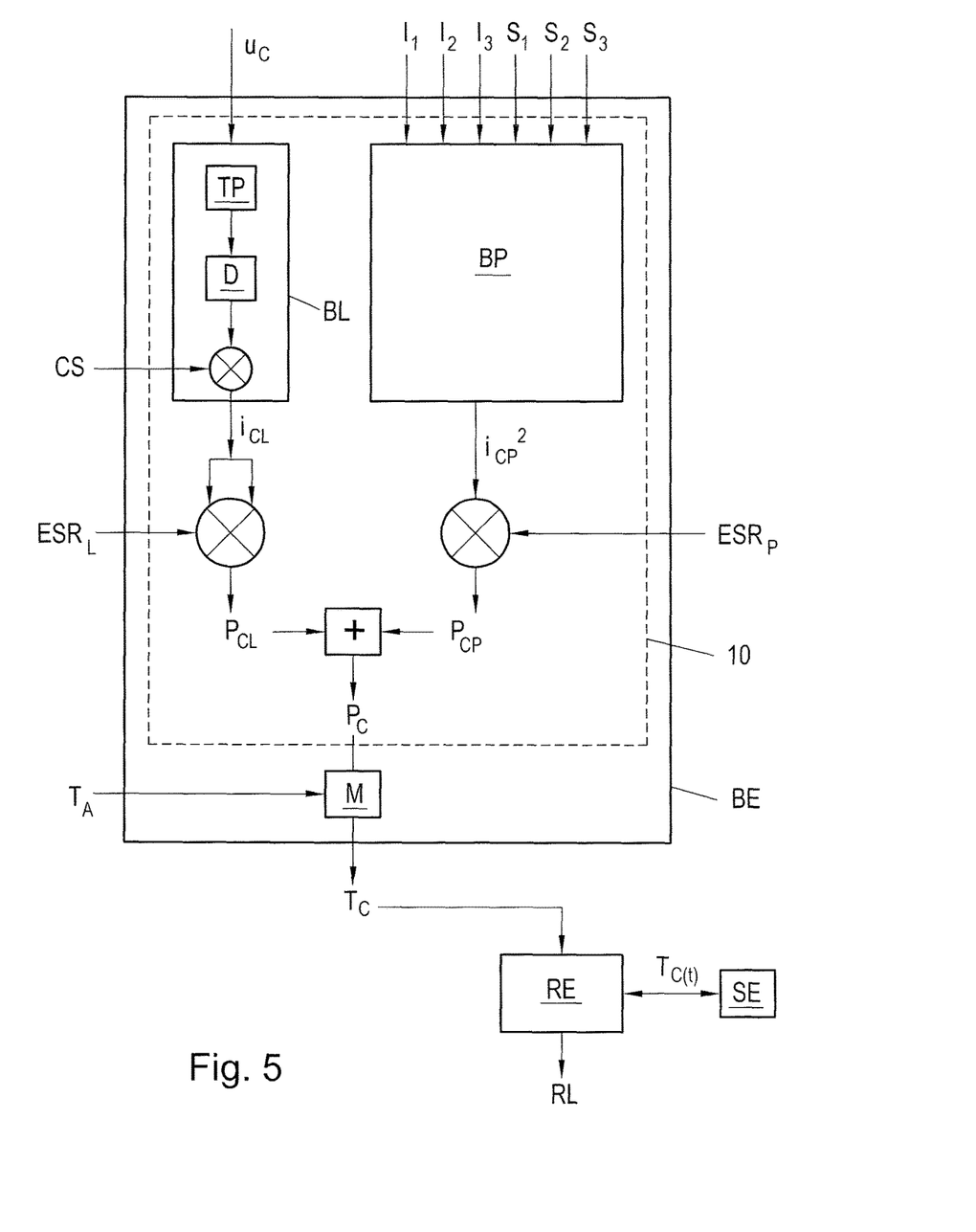
FIG. 5 shows a structure of the calculating unit for calculating the capacitor temperature and the remaining service life.

In FIG. 5, these mean calculations occur in two mean calculators MWB located in the high-frequency unit BP. Of course, it would also be possible that merely one mean calculator MWB takes on this task, in that said mean calculator is connected to the particular branch in a logically correct manner.

Therefore, for the arithmetic mean calculation, N sample values of the inverter current $i_{INV}$ in the time span T are summed and then divided by the number of recorded sample values. To determine the arithmetic mean of the square $\overline{i_{INV}^2}$, the square of the inverter current $i_{INV}^2$ in the time span T is summed and divided by the number N of recorded sample values.

The square of the high-frequency component of the modeled capacitor current $i_{CP}$ is then multiplied by the high-frequency equivalent resistance $ESR_P$ to calculate the second power loss $P_{CP}$. The first power loss $P_{CL}$ and the second power loss $P_{CP}$ are added to obtain the capacitor power loss $P_C$.

In FIG. 5, the temperature model 11 is implemented in a model component M, to which the ambient temperature $T_A$ of the link capacitor C and the capacitor power loss $P_C$ are fed. The capacitor temperature $T_C$ is output as a result.

In FIG. 5, the low-frequency unit BL, the high-frequency unit BP, the model component M, and the power-calculating unit 10 are advantageously provided in the calculating unit BE.

As shown in FIG. 5, a remaining service life unit RE can be provided, which processes the determined capacitor temperature $T_C$ as a capacitor temperature progression $T_C(t)$. For this purpose, the present capacitor temperatures $T_C$ determined in each time increment are recorded as a temporal progression. For this purpose, the capacitor temperature progression $T_C(t)$ can be stored in a memory unit SE. In the remaining service life unit RE, the remaining service life RL of the link capacitor C is estimated by means of the capacitor temperature progression $T_C(t)$, with the aid of the known Arrhenius formula. The Arrhenius formula says that the remaining service life RL of the link capacitor C is doubled for each approximately 10° C. temperature reduction. Therefore, one can proceed from the remaining service life RL at maximum temperature and convert said remaining service life to the present capacitor temperature $T_C$. As an example, a total service life of a capacitor of 1000 hours at a maximum temperature of 105° C. is assumed. If the link capacitor C is always operated at 95° C., said link capacitor has a total service life of 2000 hours. The total service life and the remaining service life RL, when specified in hours, should always be regarded in relation to an assumed capacitor temperature $T_C$. Therefore, it is helpful to specify the remaining service life RL in percent. If the aforementioned link capacitor C is operated for 500 hours at a capacitor temperature of 95° C., a remaining service life RL of 1500 hours at 95° C. remains, corresponding to a remaining service life of 750 hours at 105° C., or, alternatively presented, a remaining service life RL of 75%. If the link capacitor C is operated further for 100 hours at 105° C., the remaining service life RL is reduced to 650 hours at 105° C., or 1300 hours at 95° C., or also in general to 65%. Advantageously, an action is performed after a specified minimum remaining service life RL is reached. A signal can be output, for example at a remaining service life RL of 20%, to bring about a replacement of the link capacitor C.

It is expressly noted that the method according to the invention can also be applied to link converters 1 having several inverters 5 on the output side. Here, several inverters 5 are connected in parallel to the DC link 6. In this case, the high-frequency component of the modeled capacitor current $i_{CP}$ can be calculated in a manner similar to that described above, wherein the currents $i_{INV_i}$ are summed over the i inverters 5 to calculate the current $i_{INV}$. This sum is used for the further calculation of the arithmetic mean $\overline{i_{INV}}$ and of the square of the effective value $\overline{i_{INV}^2}$ and subsequently the high-frequency component of the capacitor current $I_{CP}$ and finally the progression of the capacitor power loss $P_C$ and of the capacitor temperature $T_C$.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for determining a capacitor temperature of a link capacitor of a link converter, which contains at least one n-phase inverter, comprising:
    modeling the link capacitor as a series interconnection of an equivalent capacitance and an equivalent series resistance (ESR), wherein a modeled capacitor current ($i_{C_m}$) flows across the equivalent series resistance (ESR);
    calculating a modeled capacitor power loss ($P_C$) from the modeled capacitor current ($i_{C_m}$) and a value of the equivalent series resistance (ESR) by a first relationship $P_C = f(i_{C_m}, ESR)$; and
    determining, from the modeled capacitor power loss, the capacitor temperature via a specified temperature model, wherein the modeled capacitor current ($i_{C_m}$) is modeled by using a measured capacitor voltage ($u_C$)

and the equivalent capacitance (CS) via a second relationship of the form $i_{Cm}=f(u_C,CS)$.

2. The method according to claim 1, wherein the first relationship is $P_C=i_{Cm}^2 ESR$.

3. The method according to claim 1, wherein the second relationship is $$i_{Cm} = CS\frac{d}{dt}u_C$$

4. The method according to claim 1, wherein the modeled capacitor current ($i_{Cm}$) is split into a low-frequency component and a high-frequency component, wherein the low-frequency component of the modeled capacitor current is used to determine a first modeled power loss and the high-frequency component of the modeled capacitor current is used to determine a second modeled power loss and the modeled capacitor power loss ($P_C$) is calculated from the sum of the first modeled power loss and the second modeled power loss.

5. The method according to claim 4, wherein the low-frequency component of the modeled capacitor current is determined by mean-filtering the capacitor voltage ($u_C$) and/or a time derivative of the capacitor voltage $$\left(\frac{d}{dt}u_C\right)$$

and/or the modeled capacitor current ($i_{Cm}$).

6. The method according to claim 4, wherein the high-frequency component of the modeled capacitor current is calculated from an inverter current caused by the inverter.

7. The method according to claim 6, wherein a square of the high-frequency component of the modeled capacitor current is calculated by determining a square of an arithmetic mean of the inverter current and an arithmetic mean of a squared inverter current and subtracting the square of the arithmetic mean of the inverter current from the arithmetic mean of the squared inverter current.

8. The method according to claim 7, wherein the arithmetic mean of the inverter current is calculated in a time-discrete manner by sampling the inverter current at a first sampling rate in a first time span, wherein a first number of sample values of the inverter current is produced and a sum of the sample values of the inverter current and is divided by the first number.

9. The method according to claim 7, wherein the arithmetic mean of the squared inverter current is calculated in a time-discrete manner by sampling a squared inverter current at a second sampling rate in a second time span, wherein a second number of sample values of the squared inverter current is produced and the sum of the sample values of the squared inverter current and is divided by the second number.

10. A device for determining the capacitor temperature of a link capacitor of a link converter, comprising:
a calculating unit, which models the link capacitor as a series interconnection of an equivalent capacitance and an equivalent series resistance (ESR), in which a modeled capacitor current (icm) flows across the equivalent series resistance (ESR),
wherein a modeled capacitor power loss ($P_C$) is calculated from the modeled capacitor current (icm) and a value of the equivalent series resistance (ESR) by a relationship of the form $P_C=f(i_{Cm},ESR)$, and
wherein the capacitor temperature is determined by a specified temperature model from the modeled capacitor power loss, wherein the modeled capacitor current ($i_{Cm}$) is modeled by using a measured capacitor voltage ($u_C$) and the equivalent capacitance (CS) via a second relationship of the form $i_{Cm}=f(u_C,CS)$.

11. The device according to claim 10, further comprising a differentiating unit and a voltage-measuring unit, wherein the voltage-measuring unit determines a capacitor voltage present at the link capacitor and feeds said capacitor voltage to the differentiating unit and the differentiating unit determines the modeled capacitor current.

12. The device according to claim 10, further comprising a low-frequency unit, which is designed to calculate a low-frequency component of the modeled capacitor current in that a number of low-pass filters is provided before and/or after the differentiating unit.

13. The device according to claim 10, further comprising a high-frequency unit, which calculates a high-frequency component of the modeled capacitor current from an inverter current caused by the inverter.

14. The device according to claim 13, further comprising a number of mean calculators, which calculate a mean of the inverter current or a mean of the squared inverter current.

15. A method for monitoring and processing of capacitor temperature, comprising:
determining the capacitor temperature of a link capacitor by:
modeling the link capacitor as a series interconnection of an equivalent capacitance (CS) and an equivalent series resistance (ESR), wherein a modeled capacitor current ($i_{Cm}$) flows across the equivalent series resistance (ESR);
calculating a modeled capacitor power loss ($P_C$) from the modeled capacitor current ($i_{Cm}$) and a value of the equivalent series resistance (ESR) by a first relationship $P_C=f(i_{Cm},ESR)$; and
determining, from the modeled capacitor power loss, the capacitor temperature via a specified temperature model, wherein the modeled capacitor current ($i_{Cm}$) is modeled by using a measured capacitor voltage ($u_C$) and the equivalent capacitance (CS) via a second relationship of the form $i_{Cm}=f(u_C,CS)$; and
monitoring and processing the determined capacitor temperature.

16. The method according to claim 15, further comprising switching-off of an element of the link converter when a maximum temperature is exceeded.

17. A method to determine a temporal progression of a capacitor temperature and to determine a remaining service life of a link capacitor from the temporal progression of the capacitor temperature by a specified relationship, comprising:
determining the capacitor temperature of a link capacitor by:
modeling the link capacitor as a series interconnection of an equivalent capacitance (CS) and an equivalent series resistance (ESR), wherein a modeled capacitor current ($i_{Cm}$) flows across the equivalent series resistance (ESR);
calculating a modeled capacitor power loss ($P_C$) from the modeled capacitor current ($i_{Cm}$) and a value of the equivalent series resistance (ESR) by a first relationship $P_C=f(i_{Cm},ESR)$; and determining, from the modeled capacitor power loss, the capacitor temperature via a specified temperature model, wherein the modeled capacitor current ($i_{Cm}$) is modeled by using a measured capacitor voltage ($u_C$) and the equivalent capacitance (CS) via a second relationship of the form $i_{Cm}=f(u_C,CS)$;

determining the temporal progression of the determined capacitor temperature; and determining the remaining service life of the link capacitor from the determined temporal progression of the capacitor temperature.

18. The method according to claim 17, wherein the specified relationship comprises the Arrhenius formula.

\* \* \* \* \*